(12) United States Patent
Tamate

(10) Patent No.: US 11,137,561 B2
(45) Date of Patent: Oct. 5, 2021

(54) POWER OVER FIBER SYSTEM AND DATA COMMUNICATION DEVICES

(71) Applicant: KYOCERA Corporation, Kyoto (JP)

(72) Inventor: Shuichi Tamate, Hino (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 17/271,598

(22) PCT Filed: May 25, 2020

(86) PCT No.: PCT/JP2020/020460
§ 371 (c)(1),
(2) Date: Feb. 26, 2021

(87) PCT Pub. No.: WO2020/255636
PCT Pub. Date: Dec. 24, 2020

(65) Prior Publication Data
US 2021/0247578 A1 Aug. 12, 2021

(30) Foreign Application Priority Data

Jun. 20, 2019 (JP) .............................. JP2019-114741

(51) Int. Cl.
| H04B 10/80 | (2013.01) |
| G02B 6/42 | (2006.01) |
| H04B 10/40 | (2013.01) |
| H04B 10/25 | (2013.01) |

(52) U.S. Cl.
CPC .......... *G02B 6/4286* (2013.01); *H04B 10/25* (2013.01); *H04B 10/40* (2013.01); *H04B 10/807* (2013.01)

(58) Field of Classification Search
None
See application file for complete search history.

(56) References Cited

U.S. PATENT DOCUMENTS

| 4,217,488 A * | 8/1980 | Hubbard | G02B 6/4469 398/142 |
| 4,298,794 A * | 11/1981 | Snitzer | G02B 6/4439 250/227.14 |
| 7,941,022 B1 * | 5/2011 | Schaffner | G02B 6/03633 385/127 |
| 2001/0021062 A1 * | 9/2001 | Probster | H01S 3/094003 359/341.33 |
| 2007/0003288 A1 * | 1/2007 | Tong | H04B 10/25751 398/142 |

(Continued)

FOREIGN PATENT DOCUMENTS

| CN | 109286440 A | 1/2019 |
| JP | 2010135989 A | 6/2010 |

(Continued)

*Primary Examiner* — Li Liu
(74) *Attorney, Agent, or Firm* — Hauptman Ham, LLP

(57) ABSTRACT

A power over fiber system transmits feed light and signal light through an optical fiber. The optical fiber includes a first transmission path and a second transmission path. The first transmission path is a core or a cladding, and the second transmission path is a cladding located on a periphery of the first transmission path. The feed light propagates through the first transmission path, and the signal light propagates through the second transmission path.

3 Claims, 9 Drawing Sheets

(56) References Cited

U.S. PATENT DOCUMENTS

2008/0277565 A1* 11/2008 Bookbinder ....... G02B 6/02361
250/206
2015/0309249 A1* 10/2015 Murshid ............ G02B 6/02042
398/55

FOREIGN PATENT DOCUMENTS

| JP | 201442166 A | 3/2014 |
| JP | 201954423 A | 4/2019 |

* cited by examiner

POWER OVER FIBER SYSTEM AND DATA COMMUNICATION DEVICES

RELATED APPLICATIONS

The present application is a National Phase of International Application Number PCT/JP2020/020460 filed May 25, 2020 and claims priority to Japanese Application Number 2019-114741 filed Jun. 20, 2019.

TECHNICAL FIELD

The present disclosure relates to a power over fiber system and data communication devices.

BACKGROUND ART

Recently, there has been studied an optical power supply system that converts electric power into light (called feed light), transmits the feed light, converts the feed light into electric energy, and uses the electric energy as electric power. There is disclosed in Patent Literature 1 an optical communication device that includes: an optical transmitter that transmits signal light modulated with an electric signal and feed light for supplying electric power; an optical fiber including a core that transmits the signal light, a first cladding that is formed around the core, has a refractive index lower than that of the core, and transmits the feed light, and a second cladding that is formed around the first cladding, and has a refractive index lower than that of the first cladding; and an optical receiver that operates with electric power obtained by converting the feed light transmitted through the first cladding of the optical fiber, and converts the signal light transmitted through the core of the optical fiber into the electric signal.

CITATION LIST

Patent Literature

Patent Literature 1: JP 2010-135989 A

SUMMARY OF INVENTION

Problem to Solve

In optical power supply, transmission of feed light having higher energy is expected. It is undesirable that feed light leaks from a damage portion when an optical fiber is damaged during installation or operation of a power over fiber system.

Solution to Problem

A power over fiber system of the present disclosure is a power over fiber system that transmits feed light and signal light through an optical fiber including: a first transmission path being a core or a cladding; and a second transmission path being a cladding located on a periphery of the first transmission path, wherein the feed light propagates through the first transmission path, and the signal light propagates through the second transmission path.

A data communication device of the present disclosure is a data communication device of a power over fiber system that transmits feed light and signal light through an optical fiber including: a first transmission path being a core or a cladding; and a second transmission path being a cladding located on a periphery of the first transmission path, including:
a power sourcing equipment that outputs the feed light to the first transmission path; and
a transmitter that transmits or a receiver that receives the signal light through the second transmission path.

Another data communication device of the present disclosure is
a data communication device of a power over fiber system that transmits feed light and signal light through an optical fiber including: a first transmission path being a core or a cladding; and a second transmission path being a cladding located on a periphery of the first transmission path, including:
a powered device that receives the feed light from the first transmission path; and
a transmitter that transmits or a receiver that receives the signal light through the second transmission path.

DESCRIPTION OF EMBODIMENTS

Hereinafter, embodiments of the present disclosure will be described with reference to the drawings.

(1) Outline of System

First Embodiment

Figure 1:
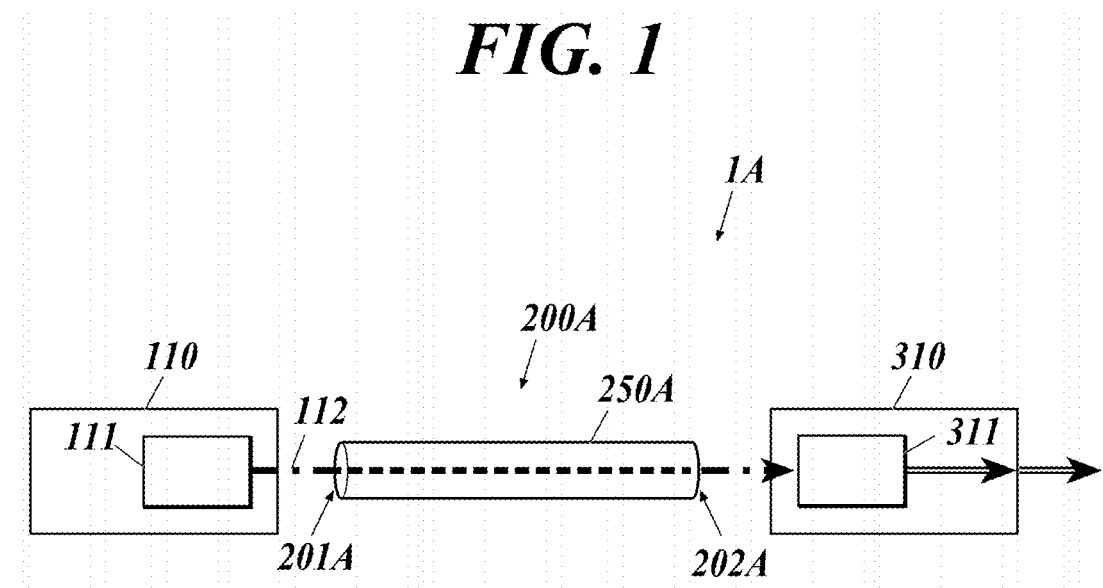
FIG. 1 is a block diagram of a power over fiber system according to a first embodiment of the present disclosure.

As shown in FIG. 1, a power over fiber (PoF) system 1A (optical power supply system) of this embodiment includes a power sourcing equipment (PSE) 110, an optical fiber cable 200A and a powered device (PD) 310.

In the present disclosure, a power sourcing equipment converts electric power into optical energy and supplies (sources) the optical energy, and a powered device receives (draws) the supplied optical energy and converts the optical energy into electric power.

The power sourcing equipment 110 includes a semiconductor laser 111 for power supply.

The optical fiber cable 200A includes an optical fiber 250A that forms a transmission path of feed light.

The powered device 310 includes a photoelectric conversion element 311.

The power sourcing equipment 110 is connected to a power source, and electrically drives the semiconductor laser 111 and so forth.

The semiconductor laser 111 oscillates with the electric power from the power source, thereby outputting feed light 112.

The optical fiber cable 200A has one end 201A connectable to the power sourcing equipment 110 and the other end 202A connectable to the powered device 310 to transmit the feed light 112.

The feed light 112 from the power sourcing equipment 110 is input to the one end 201A of the optical fiber cable 200A, propagates through the optical fiber 250A, and is output from the other end 202A of the optical fiber cable 200A to the powered device 310.

The photoelectric conversion element 311 converts the feed light 112 transmitted through the optical fiber cable 200A into electric power. The electric power obtained by the conversion of the feed light 112 by the photoelectric conversion element 311 is driving power needed in the powered device 310. The powered device 310 is capable of outputting, for an external device(s), the electric power obtained by the conversion of the feed light 112 by the photoelectric conversion element 311.

Semiconductor materials of semiconductor regions of the semiconductor laser 111 and the photoelectric conversion element 311 are semiconductors having a laser wavelength being a short wavelength of 500 nm or less. The semiconductor regions exhibit light-electricity conversion effect.

Semiconductors having a laser wavelength being a short wavelength have a large band gap and a high photoelectric conversion efficiency, and hence improve photoelectric conversion efficiency at the power supplying side and the power receiving side in optical power supply, and improve optical power supply efficiency.

Hence, as the semiconductor materials, laser media having a laser wavelength (base wave) of 200 nm to 500 nm may be used. Examples thereof include diamond, gallium oxide, aluminum nitride and gallium nitride.

Further, as the semiconductor materials, semiconductors having a band gap of 2.4 eV or greater are used.

For example, laser media having a band gap of 2.4 eV to 6.2 eV may be used. Examples thereof include diamond, gallium oxide, aluminum nitride and gallium nitride.

Laser light having a longer wavelength tends to have a higher transmission efficiency, whereas laser light having a shorter wavelength tends to have a higher photoelectric conversion efficiency. Hence, when laser light is transmitted for a long distance, laser media having a laser wavelength (base wave) of greater than 500 nm may be used as the semiconductor materials, whereas when the photoelectric conversion efficiency is given priority, laser media having a laser wavelength (base wave) of less than 200 nm may be used as the semiconductor materials.

Any of these semiconductor materials may be used in one of the semiconductor laser 111 and the photoelectric conversion element 311. This improves the photoelectric conversion efficiency at either the power supplying side or the power receiving side, and improves the optical power supply efficiency.

Second Embodiment

Figure 2:
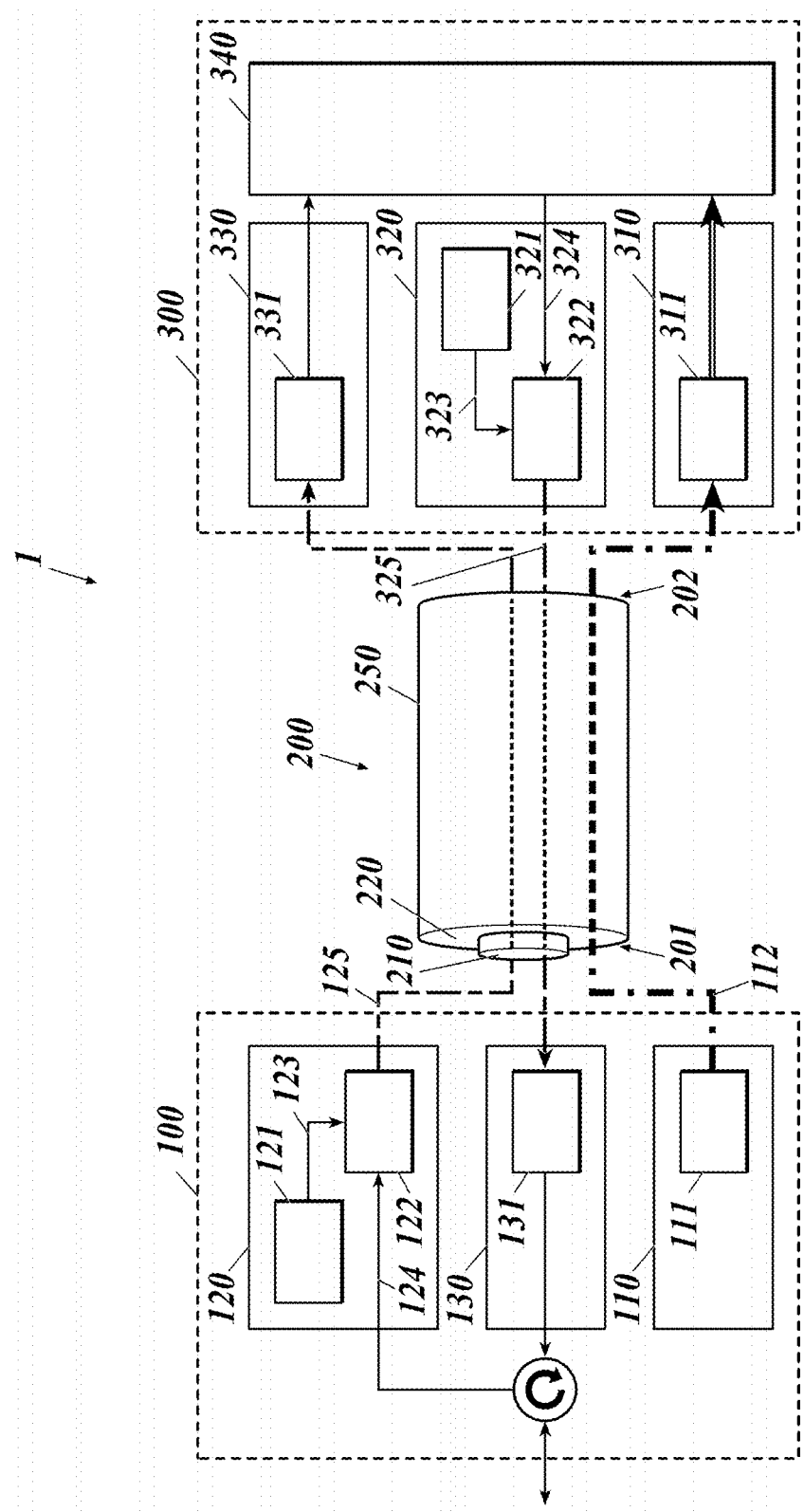
FIG. 2 is a block diagram of a power over fiber system according to a second embodiment of the present disclosure.

As shown in FIG. 2, a power over fiber (PoF) system 1 of this embodiment includes a power supply system through an optical fiber and an optical communication system therethrough, and includes: a first data communication device 100 including a power sourcing equipment (PSE) 110; an optical fiber cable 200; and a second data communication device 300 including a powered device (PD) 310.

The power sourcing equipment 110 includes a semiconductor laser 111 for power supply. The first data communication device 100 includes, in addition to the power sourcing equipment 110, a transmitter 120 and a receiver 130 for data communication. The first data communication device 100 corresponds to a data terminal equipment (DTE), a repeater or the like. The transmitter 120 includes a semiconductor laser 121 for signals and a modulator 122. The receiver 130 includes a photodiode 131 for signals.

The optical fiber cable 200 includes an optical fiber 250 including: a core 210 that forms a transmission path of signal light; and a cladding 220 that is arranged so as to surround the core 210 and forms a transmission path of feed light.

The powered device 310 includes a photoelectric conversion element 311. The second data communication device 300 includes, in addition to the powered device 310, a transmitter 320, a receiver 330 and a data processing unit 340. The second data communication device 300 corresponds to a power end station or the like. The transmitter 320 includes a semiconductor laser 321 for signals and a modulator 322. The receiver 330 includes a photodiode 331 for signals. The data processing unit 340 processes received signals. The second data communication device 300 is a node in a communication network. The second data communication device 300 may be a node that communicates with another node.

The first data communication device 100 is connected to a power source, and electrically drives the semiconductor laser 111, the semiconductor laser 121, the modulator 122, the photodiode 131 and so forth. The first data communication device 100 is a node in a communication network. The first data communication device 100 may be a node that communicates with another node.

The semiconductor laser 111 oscillates with the electric power from the power source, thereby outputting feed light 112.

The photoelectric conversion element 311 converts the feed light 112 transmitted through the optical fiber cable 200 into electric power. The electric power obtained by the conversion of the feed light 112 by the photoelectric conversion element 311 is driving power needed in the second data communication device 300, for example, driving power for the transmitter 320, the receiver 330 and the data processing unit 340. The second data communication device 300 may be capable of outputting, for an external device(s), the electric power obtained by the conversion of the feed light 112 by the photoelectric conversion element 311.

The modulator 122 of the transmitter 120 modulates laser light 123 output by the semiconductor laser 121 to signal light 125 on the basis of transmission data 124, and outputs the signal light 125.

The photodiode 331 of the receiver 330 demodulates the signal light 125 transmitted through the optical fiber cable 200 to an electric signal, and outputs the electric signal to the data processing unit 340. The data processing unit 340 transmits data of the electric signal to a node, and also receives data from the node and outputs the data to the modulator 322 as transmission data 324.

The modulator 322 of the transmitter 320 modulates laser light 323 output by the semiconductor laser 321 to signal light 325 on the basis of the transmission data 324, and outputs the signal light 325.

The photodiode 131 of the receiver 130 demodulates the signal light 325 transmitted through the optical fiber cable 200 to an electric signal, and outputs the electric signal. Data of the electric signal is transmitted to a node, whereas data from the node is the transmission data 124.

The feed light 112 and the signal light 125 from the first data communication device 100 are input to one end 201 of the optical fiber cable 200, propagate through the cladding 220 and the core 210, respectively, and are output from the other end 202 of the optical fiber cable 200 to the second data communication device 300.

The signal light 325 from the second data communication device 300 is input to the other end 202 of the optical fiber cable 200, propagates through the core 210, and is output from the one end 201 of the optical fiber cable 200 to the first data communication device 100.

Figure 3:
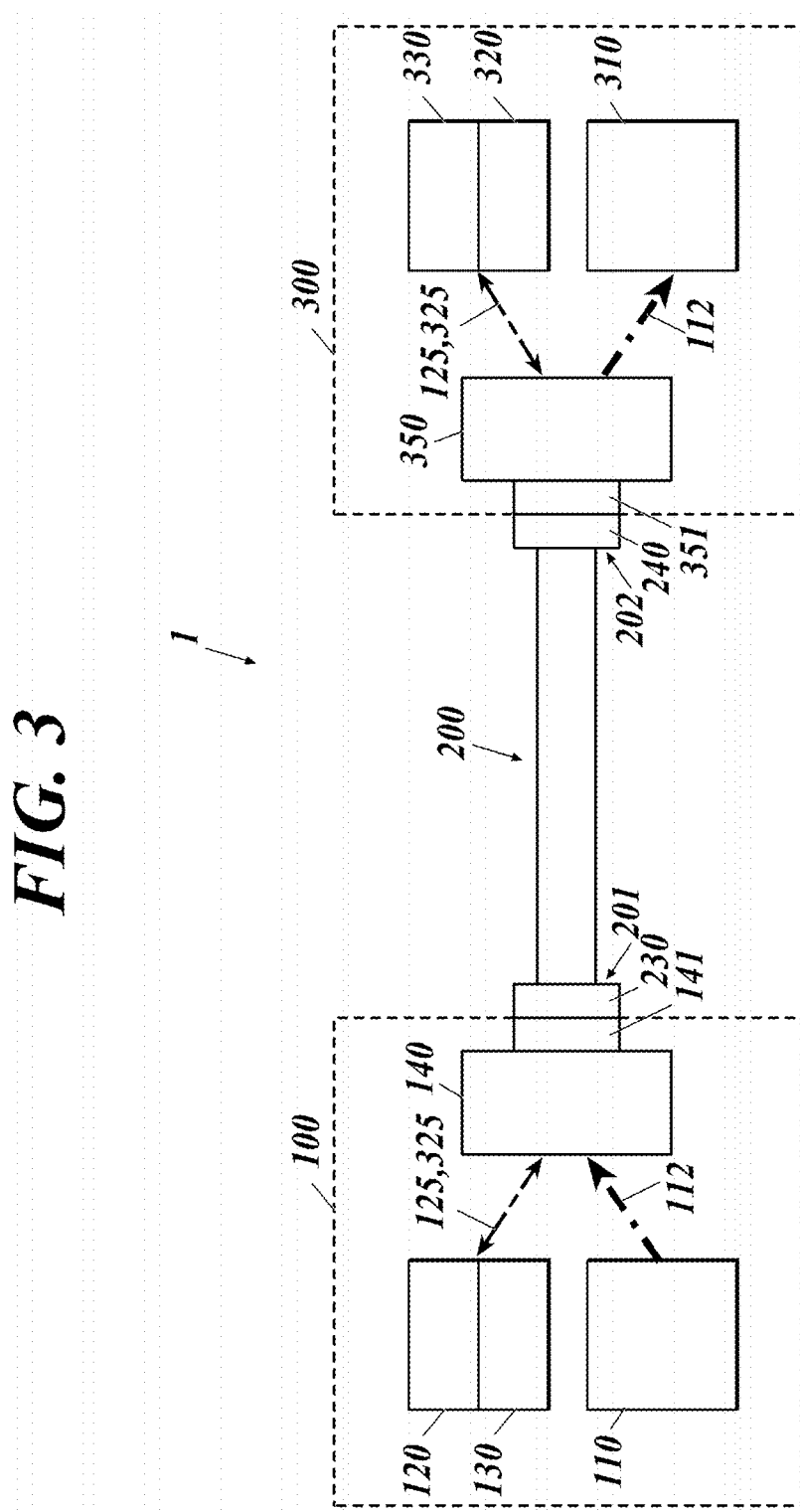
FIG. 3 is a block diagram of the power over fiber system according to the second embodiment of the present disclosure and shows optical connectors and so forth.

As shown in FIG. 3, the first data communication device 100 includes a light input/output part 140 and an optical connector 141 attached to the light input/output part 140, and the second data communication device 300 includes a light input/output part 350 and an optical connector 351 attached to the light input/output part 350. An optical connector 230 provided at the one end 201 of the optical fiber cable 200 is connected to the optical connector 141, and an optical connector 240 provided at the other end 202 of the optical fiber cable 200 is connected to the optical connector 351. The light input/output part 140 guides the feed light 112 to the cladding 220, guides the signal light 125 to the core 210, and guides the signal light 325 to the receiver 130. The light input/output part 350 guides the feed light 112 to the powered device 310, guides the signal light 125 to the receiver 330, and guides the signal light 325 to the core 210.

As described above, the optical fiber cable 200 has the one end 201 connectable to the first data communication device 100 and the other end 202 connectable to the second data communication device 300 to transmit the feed light 112. In this embodiment, the optical fiber cable 200 transmits the signal light 125/325 bidirectionally.

As the semiconductor materials of the semiconductor regions, which exhibit the light-electricity conversion effect, of the semiconductor laser 111 and the photoelectric conversion element 311, any of those described in the first embodiment can be used, thereby achieving a high optical power supply efficiency.

Figure 4:
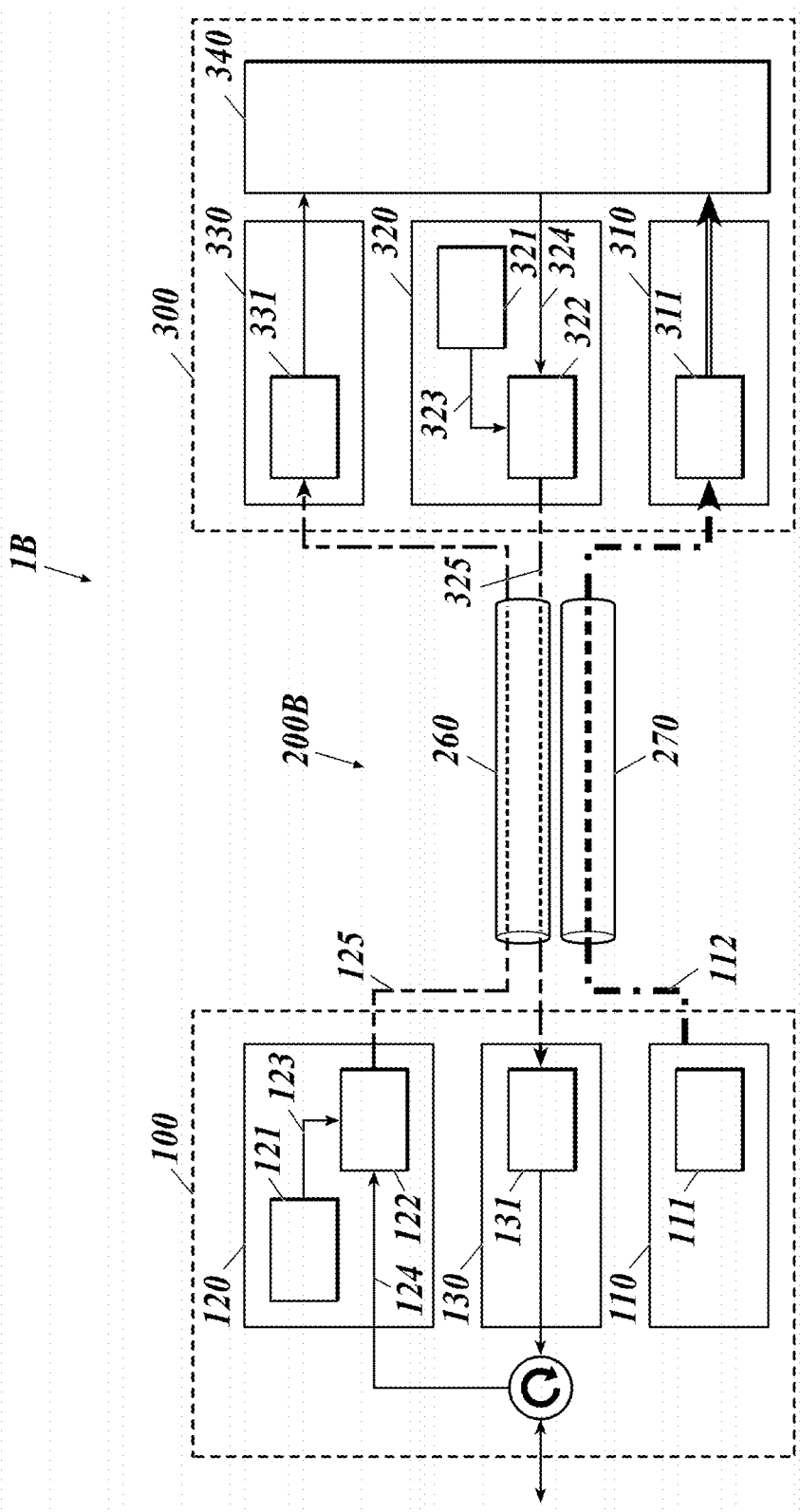
FIG. 4 is a block diagram of a power over fiber system according to another embodiment of the present disclosure.

Like an optical fiber cable 200B of a power over fiber system 1B shown in FIG. 4, an optical fiber 260 that transmits signal light and an optical fiber 270 that transmits feed light may be provided separately. Further, the optical fiber cable 200B may be composed of a plurality of optical fiber cables.

(2) Means for Suppressing Leakage of Feed Light

Next, a means for suppressing leakage of the feed light will be described.

Third Embodiment

Figure 5:
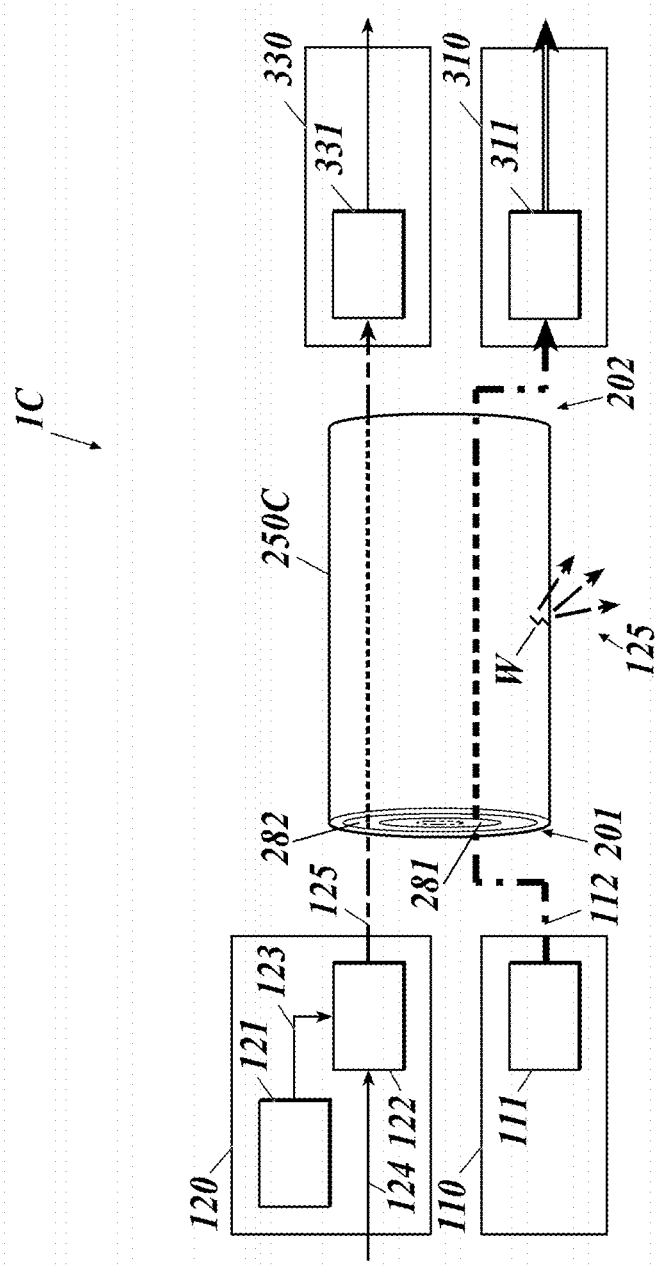
FIG. 5 is a block diagram of a power over fiber system according to a third embodiment to which a means for suppressing leakage of feed light is applied.

FIG. 5 is a block diagram of a power over fiber system according to a third embodiment to which the means for suppressing leakage of the feed light is applied. In FIG. 5, the same components as those described above are denoted by the same reference signs, and detailed descriptions thereof are omitted.

A power over fiber system 1C of the third embodiment includes an optical fiber 250C including a first transmission path 281 and a second transmission path 282 capable of transmitting light. The optical fiber 250C includes a core, a first cladding around the core and a second cladding around the first cladding. The optical fiber 250C may have more claddings, such as a third cladding located on the periphery of the second cladding and a fourth cladding located on the periphery of the third cladding. Two of the core and the claddings are used as the first transmission path 281 and the second transmission path 282. The feed light 112 is transmitted through the first transmission path 281, and the signal light 125 is transmitted through the second transmission path 282. As the second transmission path 282, a cladding located on the periphery of the first transmission path 281 is selected.

As an example, it is assumed that the optical fiber 250C having a core, a first cladding around the core and a second cladding around the first cladding is employed. In this case, the core may be used as the first transmission path 281 for transmitting the feed light 112, and the first cladding may be used as the second transmission path 282 for transmitting the signal light 125.

As another example, it is assumed that the optical fiber 250C having a core, a first cladding around the core, a second cladding around the first cladding and a third cladding around the second cladding is employed. In this case, the first cladding may be used as the first transmission path 281 for transmitting the feed light 112, and the second cladding may be used as the second transmission path 282 for transmitting the signal light 125.

The first transmission path 281 through which the feed light 112 propagates may be configured such that the cross-sectional area is larger than that of the other transmission path(s).

The power sourcing equipment 110 outputs the feed light 112 to the first transmission path 281 (e.g. core) of the optical fiber 250C. The powered device 310 receives the feed light 112 from the first transmission path 281 of the optical fiber 250C.

The transmitter 120 outputs the signal light 125 to the second transmission path 282 (e.g. first cladding) of the optical fiber 250C. The receiver 330 receives the signal light 125 from the second transmission path 282 of the optical fiber 250C. The signal light 125 may contain body data of data communication, or may be a signal for detecting damage to the optical fiber 250C.

It is assumed, as shown in FIG. 5, that in the power over fiber system 1C of the third embodiment, the optical fiber 250C is damaged during transmission of the feed light 112 and the signal light 125. The feed light 112 is high energy light (high intensity) as compared with the signal light 125. It is not preferable that high energy light leak when the optical fiber 250C is broken. At a damage portion W, damage starts from the outer transmission path. Hence, before the feed light 112 leaks from the first transmission path 281, the signal light 125 leaks from the second transmission path 282. Leakage of the signal light 125 appears as an abnormality, such as decrease in the amount of received light by the receiver 330, increase in the amount of reflected light of the signal light 125, or the signal light 125 leaked from the damage portion W being captured by an infrared camera. Hence, damage to the optical fiber 250C can be quickly detected from an abnormality of the signal light 125, so that, before damage to the optical fiber 250C progresses and the feed light 112 leaks, the damage may be dealt with. Thus, the power over fiber system 1C of the third embodiment can suppress sudden leakage of the feed light 112 or continuous leakage thereof for a long time.

The system of the third embodiment is applicable to the power over fiber systems shown in FIG. 1, FIG. 2 and FIG.

4. When the system of the third embodiment is applied to the system of FIG. 1, the optical fiber 250A of FIG. 1 is replaced by the optical fiber 250C of the third embodiment, the power sourcing equipment 110 of FIG. 1 is replaced by the power souring equipment 110 and the transmitter 120 of the third embodiment, and the powered device 310 of FIG. 1 is replaced by the powered device 310 and the receiver 330 of the third embodiment.

When the system of the third embodiment is applied to the system of FIG. 2, the optical fiber 250 of FIG. 2 is replaced by the optical fiber 250C of the third embodiment, and the point to/from which each of the power sourcing equipment 110, the transmitter 120, the powered device 310 and the receiver 330 of FIG. 2 outputs/receives the feed light 112 or the signal light 125 is made to be the same as that of the third embodiment. Alternatively, in addition to the transmitter 120 and the receiver 330 of FIG. 2, the transmitter 120 and the receiver 330 of the third embodiment may be added. In this case, two sets of the transmitter 120 and the receiver 330 are provided in the system. Of these two sets of the transmitter 120 and the receiver 330, one set may transmit and receive the signal light 125 through the second transmission path 282 (e.g. second cladding), and the other set may transmit and receive the signal light 125 through a transmission path (e.g. core) located on the inner side of the first transmission path 281 (e.g. first cladding).

When the system of the third embodiment is applied to the system of FIG. 4, the optical fiber 270 of FIG. 4 is replaced by the optical fiber 250C of the third embodiment, the power sourcing equipment 110 of FIG. 4 is replaced by the power sourcing equipment 110 and the transmitter 120 of the third embodiment, and the powered device 310 of FIG. 4 is replaced by the powered device 310 and the receiver 330 of the third embodiment.

Figure 6:
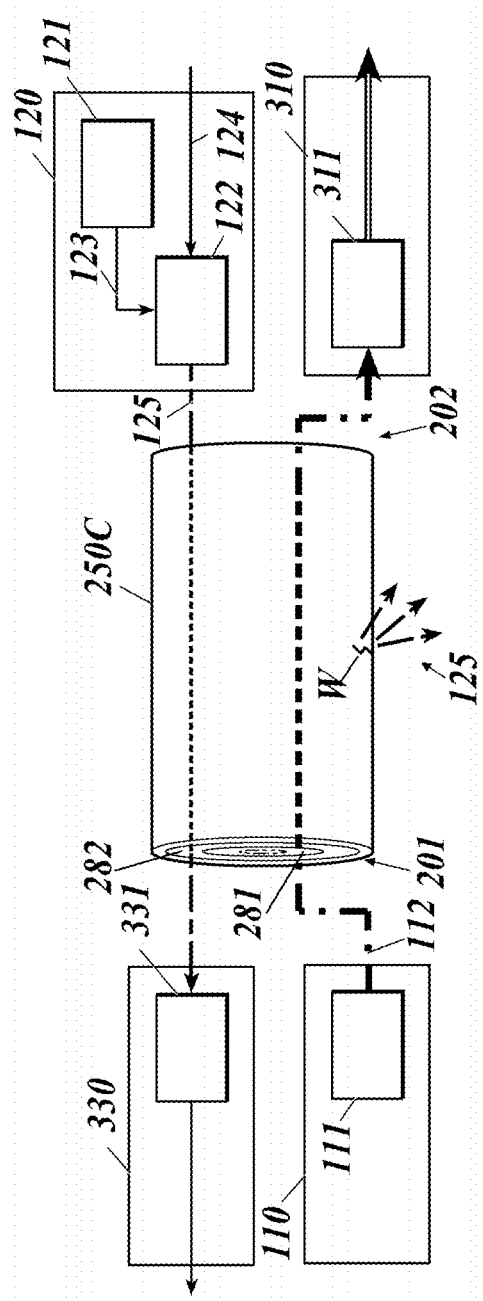
FIG. 6 is a block diagram of a power over fiber system according to another embodiment to which the means for suppressing leakage of feed light is applied.

In the power over fiber system 1C of the third embodiment, the transmitter 120 and the receiver 330 may be arranged reversely as shown in FIG. 6.

Fourth Embodiment

Figure 7:
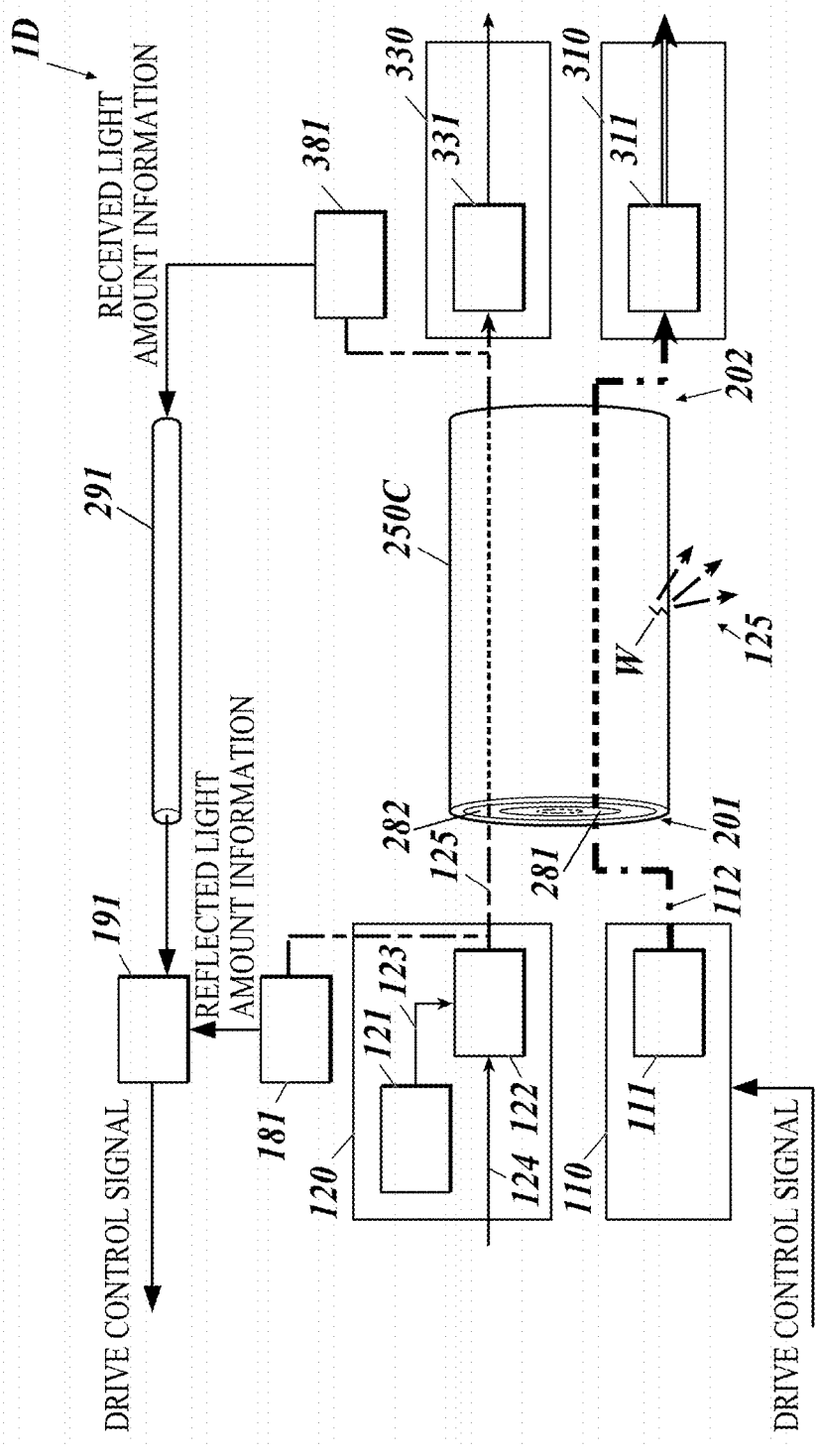
FIG. 7 is a block diagram of a power over fiber system according to a fourth embodiment to which the means for suppressing leakage of feed light is applied.

FIG. 7 is a block diagram of a power over fiber system according to a fourth embodiment to which the means for suppressing leakage of the feed light is applied. In FIG. 7, the same components as those of FIG. 5 are denoted by the same reference signs, and detailed descriptions thereof are omitted.

A power over fiber system 1D of the fourth embodiment further includes a monitor 181 that monitors the reflected light amount of the signal light 125, a monitor 381 that monitors the received light amount of the signal light 125, and a controller 191 that performs control to stop drive or to reduce output of the power sourcing equipment 110 on the basis of an abnormality in the reflected light amount or the received light amount of the signal light 125. One of the monitors 181 and 381 may be omitted.

When the system 1D has the monitor 381 on the powered device 310 side, a transmission path 291 capable of transmitting, from the monitor 381 to the controller 191, a signal indicating an abnormality or a signal indicating the received light amount may be provided. The transmission path 291 may be a metal wiring, a wireless transmission path, a transmission path closer to the center than the second transmission path 282 in the optical fiber 250C is, or an optical fiber other than the optical fiber 250C.

The monitor 181 may include an isolator that isolates light returned from the second transmission path 282 of the optical fiber 250C, and a light receiving element (photodiode, etc.) that receives the isolated returned light.

The monitor 381 may include, for example, a beam splitter that splits the signal light 125 into portions by a certain ratio, and a light receiving element (photodiode, etc.) that receives a portion of the split signal light. Alternatively, the receiver 330 may be configured to double as the monitor 381.

Figure 8:
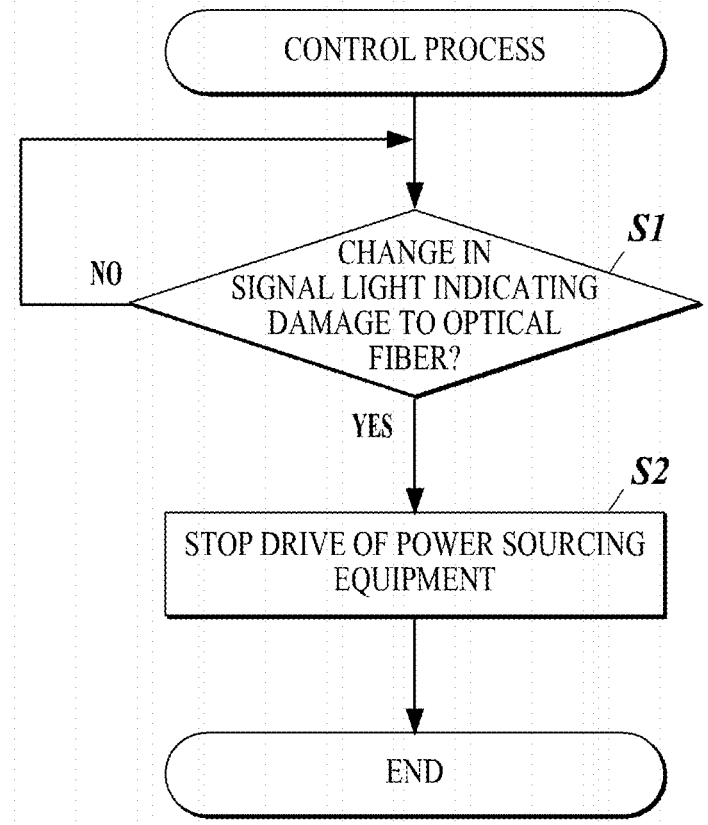
FIG. 8 is a flowchart showing an example of a control process that is performed by a controller.

As shown in FIG. 8, the controller 191 determines whether a change in the signal light 125 indicating damage to the optical fiber 250C has occurred (Step S1), and if the controller 191 determines that the change has occurred, the controller 191 stops the drive or reduces the output of the power sourcing equipment 110 (Step S2). The change in the signal light 125 in Step S1 is, for example, increase in the reflected light (increase to be higher than a threshold), decrease in the received light amount (decrease to be lower than a threshold) or the like. The controller 191 may be composed of a microcomputer, or may be composed of a sequencer utilizing an analog circuit or a digital circuit.

It is assumed, as shown in FIG. 7, that in the power over fiber system 1D of the fourth embodiment, the optical fiber 250C is damaged during transmission of the feed light 112 and the signal light 125. At a damage portion W, damage starts from the outer transmission path. Hence, before the feed light 112 leaks from the first transmission path 281, the signal light 125 leaks from the second transmission path 282. When the signal light 125 leaks, reflection of the signal light 125 at the damage portion W increases, and the propagated light amount of the signal light 125 to the other end 202 of the optical fiber 250C decreases. By the monitors 181 and 381 monitoring these, the controller 191 detects the change in the reflected light amount or the received light amount, and stops the drive or reduces the output of the power sourcing equipment 110. This control stops or weakens the feed light 112 that propagates through the first transmission path 281. Hence, even when damage to the optical fiber 250C progresses and reaches the first transmission path 281, leakage of the high-intensity feed light 112 from the damage portion is suppressed.

Similarly to the third embodiment, the configuration of the fourth embodiment is applicable to the power over fiber systems of FIG. 1, FIG. 2 and FIG. 4.

Figure 9:
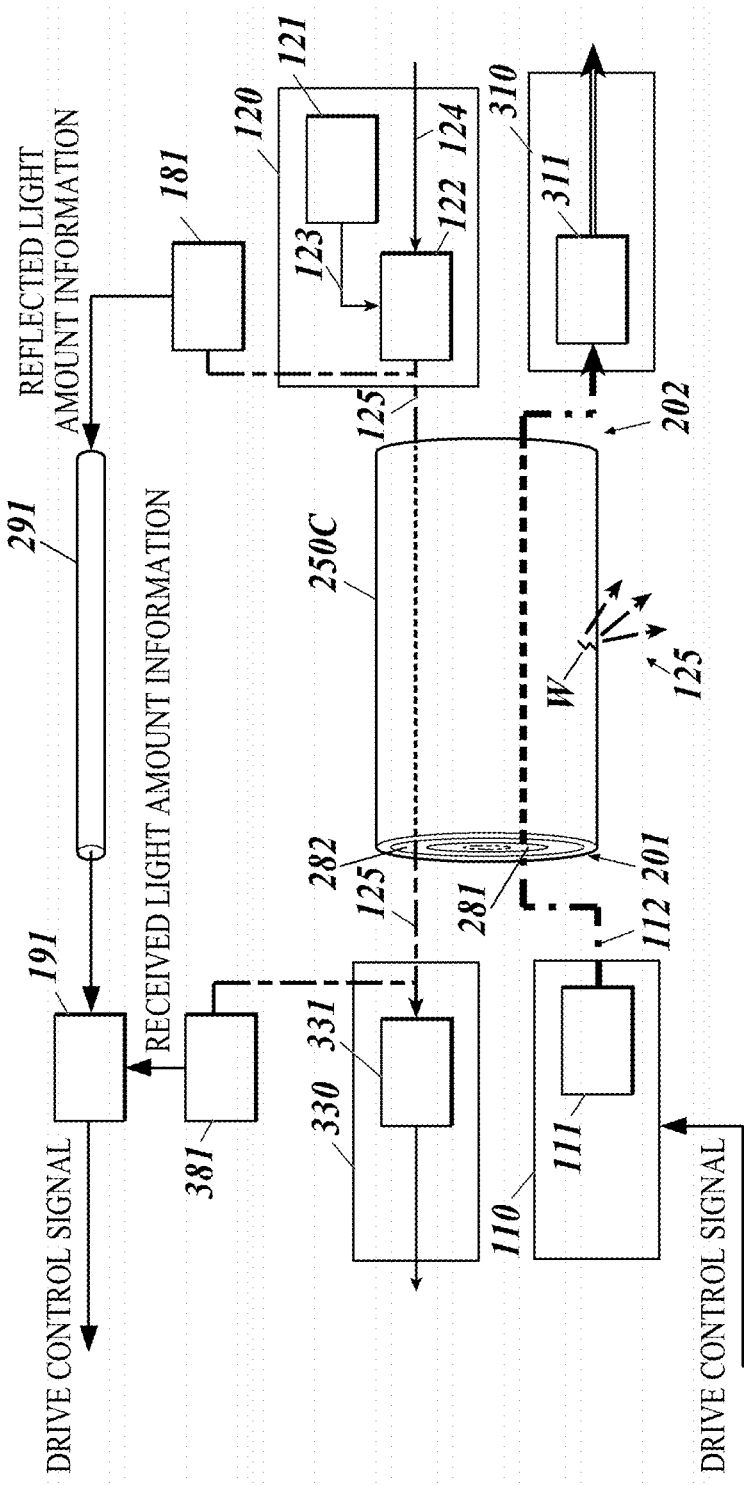
FIG. 9 is a block diagram of a power over fiber system according to another embodiment to which the means for suppressing leakage of feed light is applied.

In the power over fiber system 1D of the fourth embodiment, (i) the transmitter 120 and the monitor 181 and (ii) the receiver 330 and the monitor 381 may be arranged reversely as shown in FIG. 9. The controller 191 may be arranged in a device different from the device having the power sourcing equipment 110. In this case, the controller 191 may employ a configuration to transmit a control signal through a transmission path different from the first transmission path 281 and the second transmission path 282 to stop the drive of the power sourcing equipment 110.

Although some embodiments of the present disclosure have been described above, these embodiments are made for purposes of illustration and example only. The present invention can be carried out in various other forms, and each component may be omitted, replaced or modified/changed within a range not departing from the scope of the present invention.

INDUSTRIAL APPLICABILITY

The present disclosure is applicable to power over fiber systems and data communication devices.

REFERENCE SIGNS LIST

1A Power over Fiber System
1 Power over Fiber System

1B Power over Fiber System
1C Power over Fiber System
1D Power over Fiber System
100 First Data Communication Device
110 Power Sourcing Equipment
111 Semiconductor Laser for Power Supply
112 Feed Light
120 Transmitter
125 Signal Light
130 Receiver
140 Light Input/Output Part
141 Optical Connector
181 Monitor
191 Controller
200A Optical Fiber Cable
200 Optical Fiber Cable
200B Optical Fiber Cable
210 Core
220 Cladding
250A Optical Fiber
250 Optical Fiber
250C Optical Fiber
281 First Transmission Path
282 First Transmission Path
W Damage portion
260 Optical Fiber
270 Optical Fiber
300 Second Data Communication Device
310 Powered Device
311 Photoelectric Conversion Element
320 Transmitter
325 Signal Light
330 Receiver
350 Light Input/Output Part
351 Optical Connector
381 Monitor

The invention claimed is:

1. A power over fiber system that transmits feed light and signal light through an optical fiber including:
a first transmission path being a core or a cladding; and
a second transmission path being a cladding located on a periphery of the first transmission path,
wherein the feed light propagates through the first transmission path, and the signal light propagates through the second transmission path, and
wherein the power over fiber system further comprises:
a monitor that monitors the signal light; and
a controller that stops the transmission of the feed light or reduces output of the feed light in response to determining that the signal light is abnormal based on the monitoring by the monitor.

2. A data communication device of a power over fiber system that transmits feed light and signal light through an optical fiber including: a first transmission path being a core or a cladding; and a second transmission path being a cladding located on a periphery of the first transmission path, comprising:
a power sourcing equipment that outputs the feed light to the first transmission path; and
a transmitter that transmits or a receiver that receives the signal light through the second transmission path,
wherein the data communication device further comprises:
a monitor that monitors a reflected light amount or a received light amount of the signal light; and
a controller that stops the transmission of the feed light or reduces output of the feed light in response to determining that the signal light is abnormal based on the monitoring by the monitor.

3. A data communication device of a power over fiber system that transmits feed light and signal light through an optical fiber including: a first transmission path being a core or a cladding; and a second transmission path being a cladding located on a periphery of the first transmission path, comprising:
a powered device that receives the feed light from the first transmission path; and
a transmitter that transmits or a receiver that receives the signal light through the second transmission path,
wherein the data communication device further comprises
a monitor that monitors a reflected light amount or a received light amount of the signal light; and
a controller that stops the transmission of the feed light or reduces output of the feed light in response to determining that the signal light is abnormal based on the monitoring by the monitor.

* * * * *